United States Patent
Mikoshi et al.

(10) Patent No.: US 12,188,673 B2
(45) Date of Patent: Jan. 7, 2025

(54) AIR-CONDITIONING SYSTEM, AIR CONDITIONER, AND METHOD FOR RECOGNIZING AIR CONDITIONER

(71) Applicant: DAIKIN INDUSTRIES, LTD., Osaka (JP)

(72) Inventors: Akira Mikoshi, Osaka (JP); Yuki Murakami, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/127,240

(22) Filed: Mar. 28, 2023

(65) Prior Publication Data
US 2023/0235912 A1 Jul. 27, 2023

Related U.S. Application Data

(63) Continuation of application No. PCT/JP2021/035625, filed on Sep. 28, 2021.

(30) Foreign Application Priority Data

Sep. 29, 2020 (JP) .................. 2020-163830

(51) Int. Cl.
F24F 11/63 (2018.01)
(52) U.S. Cl.
CPC .................. *F24F 11/63* (2018.01)
(58) Field of Classification Search
None
See application file for complete search history.

(56) References Cited

U.S. PATENT DOCUMENTS 5,499,510 A   3/1996  Yoshida et al.
6,917,988 B1* 7/2005  Allen ............. H04L 12/42
                                              710/21

(Continued)

FOREIGN PATENT DOCUMENTS

EP    2 249 091 B1    2/2018
JP    2000-88321 A    3/2000

(Continued)

OTHER PUBLICATIONS

International Search Report (PCT/ISA/210) issued in PCT/JP2021/035625, dated Nov. 16, 2021.

(Continued)

*Primary Examiner* — Thomas C Lee
*Assistant Examiner* — Anzuman Sharmin
(74) *Attorney, Agent, or Firm* — BIRCH, STEWART, KOLASCH & BIRCH, LLP

(57) ABSTRACT

A recognition process for an air conditioner is executed while the deterioration of the environment due to stoppage of the air conditioner is suppressed. In an air-conditioning system in which a plurality of air conditioners belonging to an identical refrigerant system are connected through a communication line inside the identical system and a plurality of air conditioners belonging to different refrigerant systems are connected through a communication line outside the different systems, for the plurality of air conditioners belonging to the identical refrigerant system, a recognition process is executable while an air-conditioning control process is executed by transmission through at least the communication line inside the system.

6 Claims, 12 Drawing Sheets

(56) References Cited

U.S. PATENT DOCUMENTS

| | | | | |
|---|---|---|---|---|
| 2003/0074450 A1* | 4/2003 | Kang | ............ | H04L 12/2803 |
| | | | | 709/227 |
| 2009/0066508 A1 | 3/2009 | Ueda et al. | | |
| 2014/0112166 A1* | 4/2014 | Schwengler | ......... | H04L 5/0007 |
| | | | | 370/252 |
| 2015/0057823 A1* | 2/2015 | Nakayama | ......... | H04L 12/2816 |
| | | | | 700/295 |
| 2017/0005817 A1* | 1/2017 | Gould | ............ | H04L 12/281 |
| 2020/0107241 A1* | 4/2020 | Ramisetti | ............ | H04B 17/318 |

FOREIGN PATENT DOCUMENTS

| | | | | | |
|---|---|---|---|---|---|
| JP | 2003-90585 | A | | 3/2003 | |
| JP | 2003302091 | A | * | 10/2003 | |
| JP | 2006-29642 | A | | 2/2006 | |
| JP | 2007-71428 | A | | 3/2007 | |
| JP | 2007-263404 | A | | 10/2007 | |
| JP | 2009222339 | A | * | 10/2009 | |
| JP | 2015-92127 | A | | 5/2015 | |
| JP | 2015-227734 | A | | 12/2015 | |
| JP | 2016-219983 | A | | 12/2016 | |
| JP | 2016208489 | A | * | 12/2016 | ............ G08C 17/00 |

OTHER PUBLICATIONS

International Preliminary Report on Patentability issued in PCT/JP2021/035625, dated Mar. 28, 2023.

Extended European Search Report for European Application No. 21875614.6, dated Feb. 9, 2024.

* cited by examiner

AIR-CONDITIONING SYSTEM, AIR CONDITIONER, AND METHOD FOR RECOGNIZING AIR CONDITIONER

CROSS REFERENCE TO RELATED APPLICATIONS

This application is a Continuation of PCT International Application No. PCT/JP2021/035625, filed on Sep. 28, 2021, which claims priority under 35 U.S.C. § 119(a) to Patent Application No. JP 2020-163830, filed in Japan on Sep. 29, 2020, all of which are hereby expressly incorporated by reference into the present application.

TECHNICAL FIELD

The present disclosure relates to an air-conditioning system, an air conditioner, and a method for recognizing an air conditioner.

BACKGROUND ART

Conventionally, air-conditioning systems have been used, which include a plurality of refrigerant systems configured by connecting a plurality of air conditioners such as outdoor units and indoor units to each other so as to circulate a refrigerant.

In such an air-conditioning system including a plurality of air conditioners, addresses distinguishable from each other are allocated to the air conditioners in order to manage and control each of the air conditioners. Furthermore, the information on the refrigerant system to which each air conditioner belongs is determined in association with the address so that management and control may be executed for each refrigerant system.

For example, in PTL 1 (Japanese Unexamined Patent Application Publication No. 2003-90585), in such an air-conditioning system, after the operations of all the air conditioners are stopped, any one outdoor unit is started up, and various refrigerant temperatures are verified so that the refrigerant system to which each air conditioner belongs is determined.

SUMMARY

An air-conditioning system according to a first aspect is an air-conditioning system in which a plurality of air conditioners belonging to an identical refrigerant system are connected through a communication line inside the system and a plurality of air conditioners belonging to different refrigerant systems are connected through a communication line outside the systems and, for the plurality of air conditioners belonging to the identical refrigerant system, a recognition process is executable while a control process is executed by transmission through at least the communication line inside the system.

An air conditioner according to a tenth aspect is an air conditioner in an air-conditioning system in which a plurality of air conditioners belonging to an identical refrigerant system are connected through a communication line inside the system and a plurality of air conditioners belonging to different refrigerant systems are connected through a communication line outside the systems, and a recognition process is executable while a control process is executed by transmission through at least the communication line inside the system with the other air conditioner belonging to the identical refrigerant system.

A method for recognizing an air conditioner according to an eleventh aspect is a method for recognizing an air conditioner in an air-conditioning system in which a plurality of air conditioners belonging to an identical refrigerant system are connected through a communication line inside the system and a plurality of air conditioners belonging to the different refrigerant systems are connected through a communication line outside the systems, and the method includes, for the plurality of air conditioners belonging to the identical refrigerant system, executing a recognition process while executing a control process by transmission through at least the communication line inside the system.

DESCRIPTION OF EMBODIMENTS

An example of an air-conditioning system is described below while an example of a process in a case where an air-conditioning control process of an air conditioner and a system recognition process are executed in the air-conditioning system is described.

(1) Overview of Air-Conditioning System 1

Figure 1:
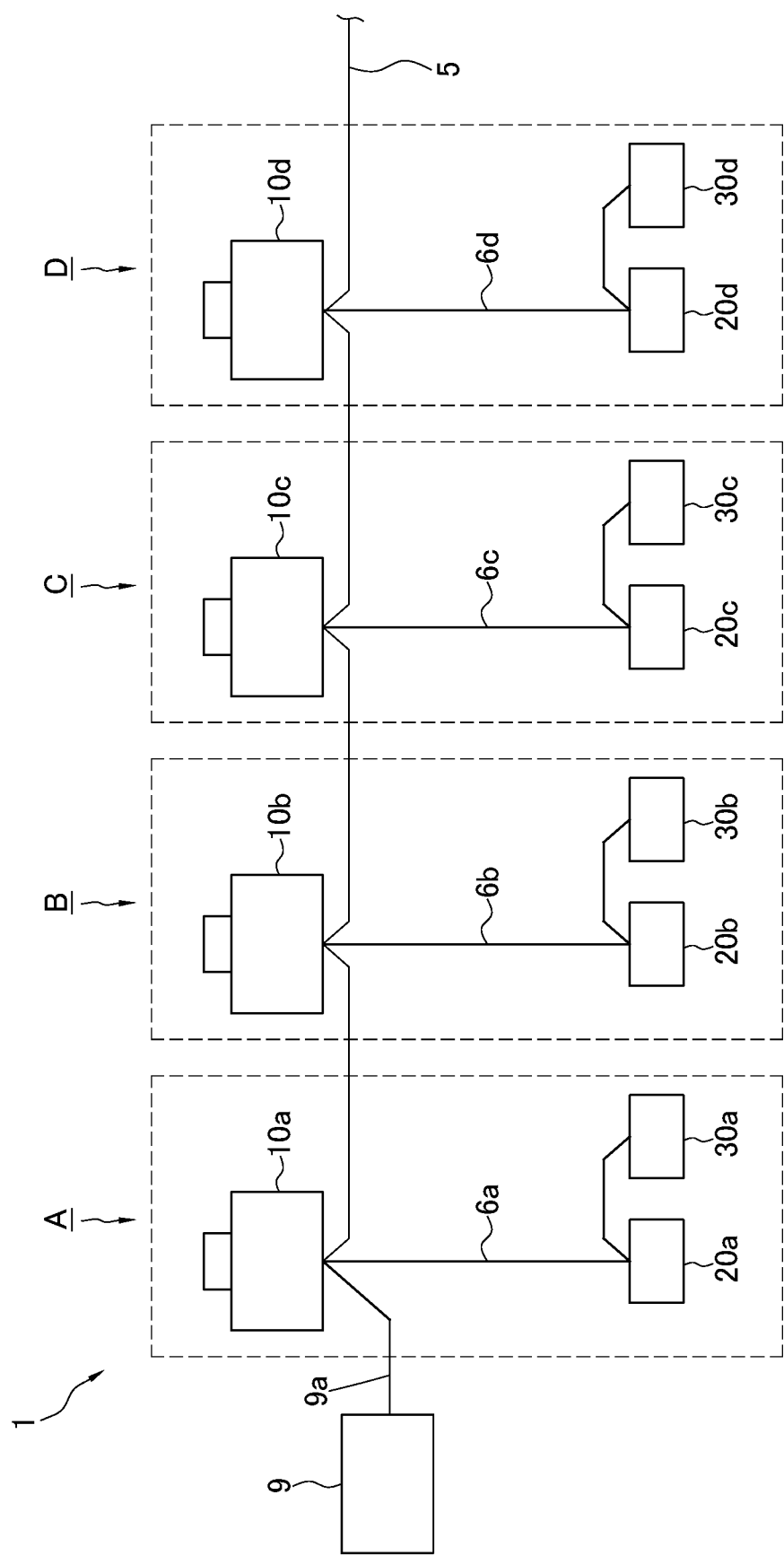
FIG. 1 is a schematic configuration diagram illustrating an electric connection relation among a plurality of air conditioners.
Figure 2:
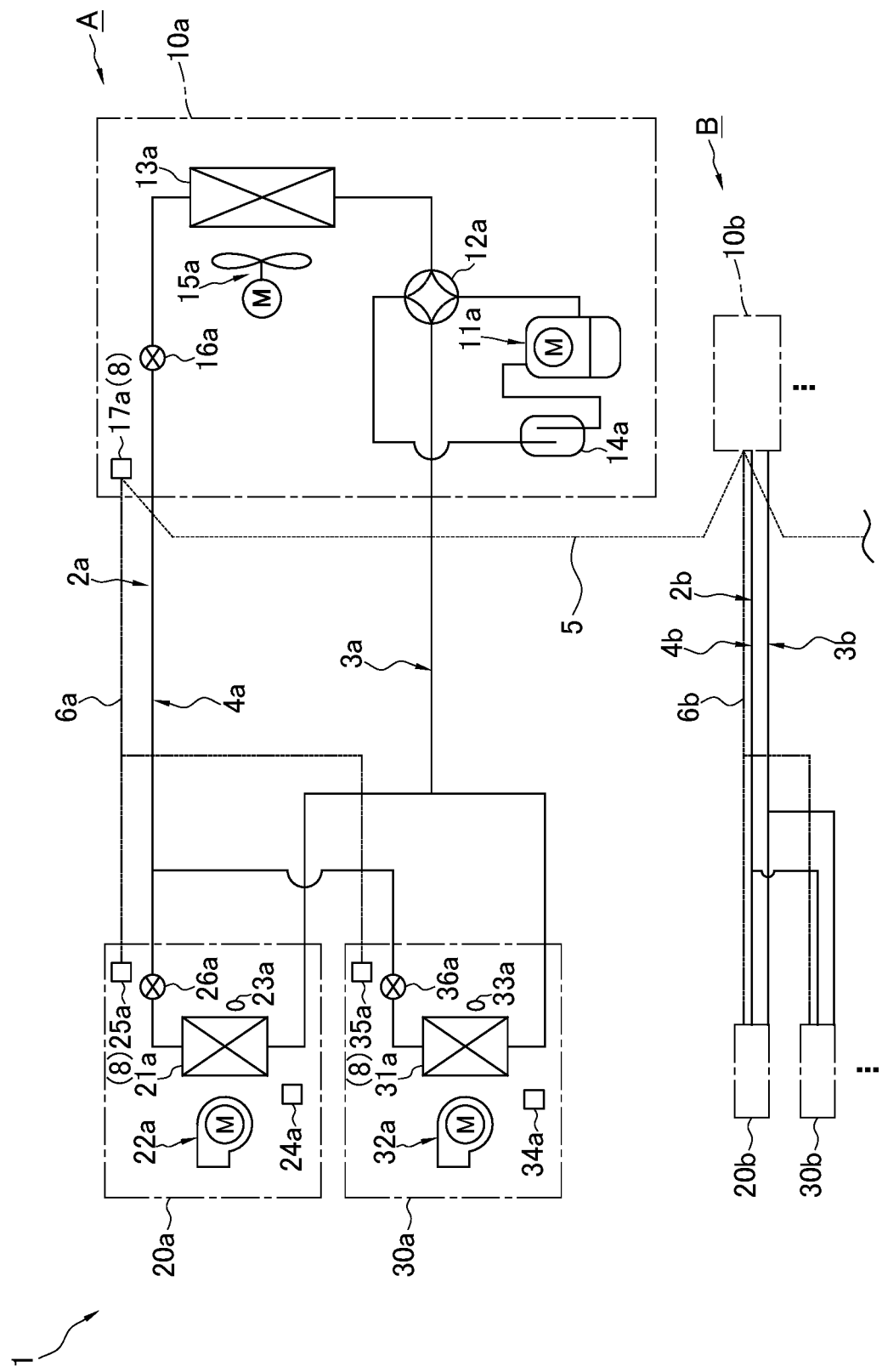
FIG. 2 is a schematic configuration diagram illustrating a connection relation regarding refrigerant circulation of a plurality of air conditioners.
Figure 3:
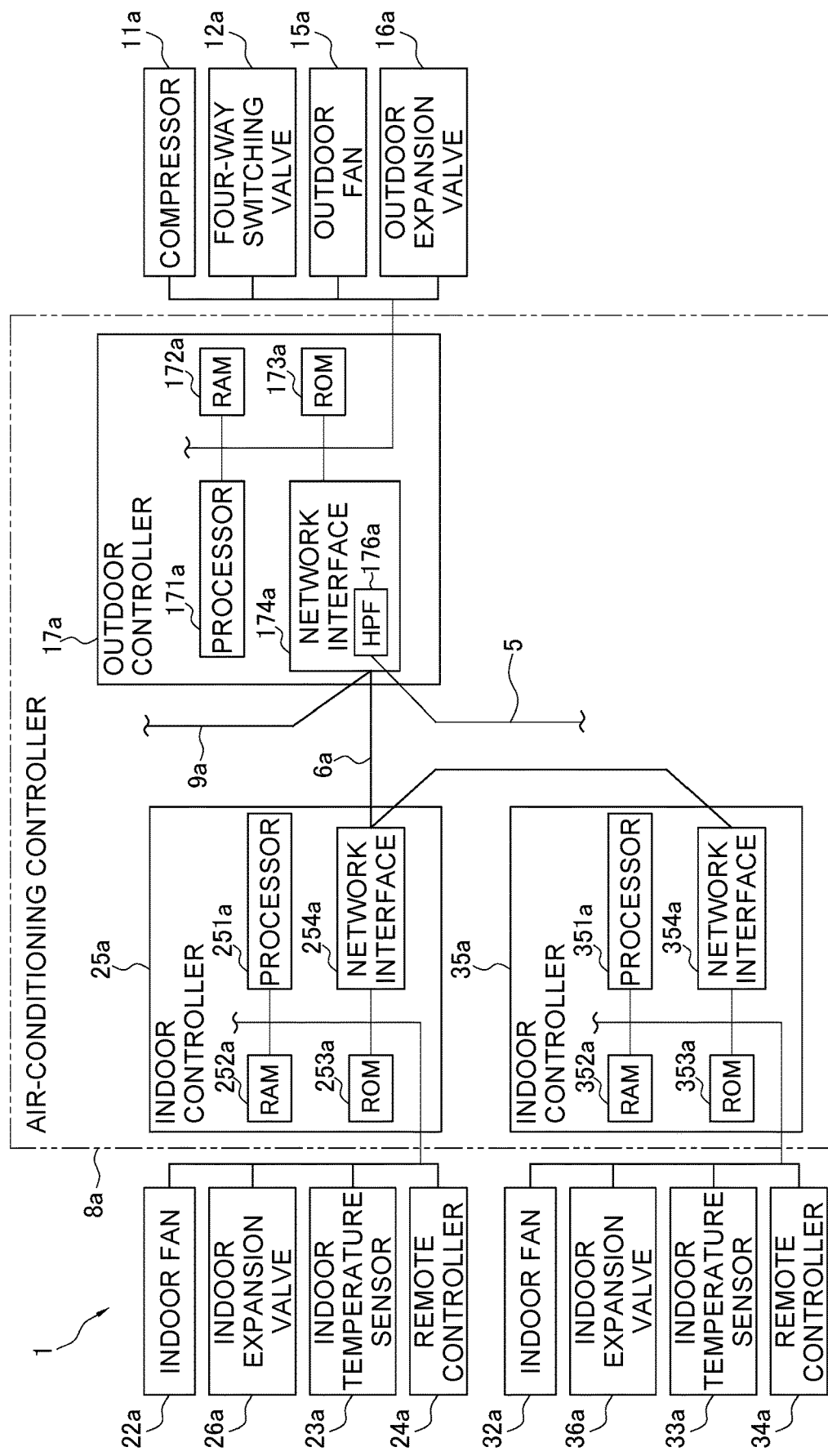
FIG. 3 is a hardware configuration diagram of an air-conditioning system.
Figure 4:
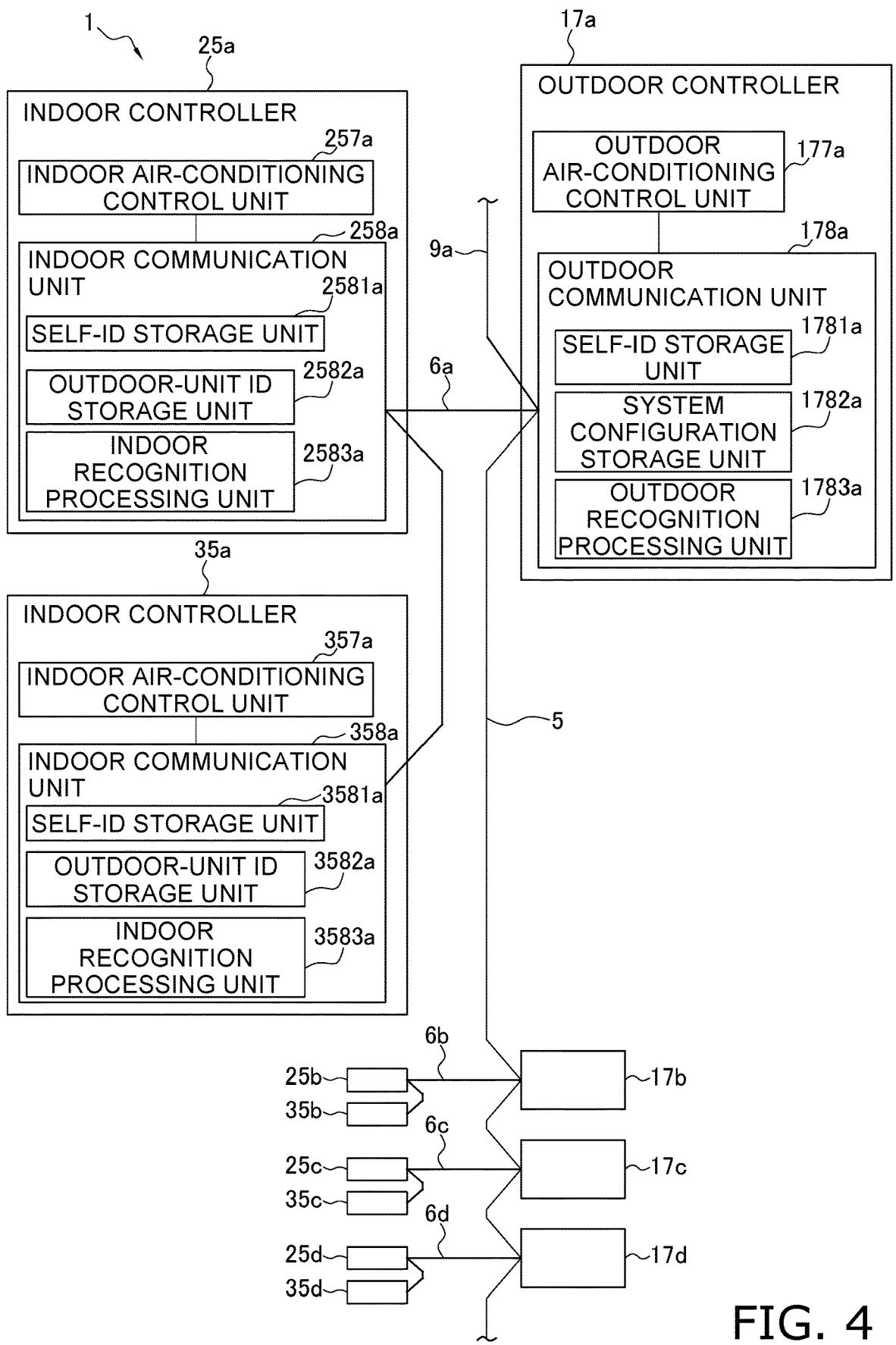
FIG. 4 is a functional block configuration diagram in the air-conditioning system.

FIG. 1 illustrates an electric connection relation among a plurality of air conditioners (outdoor units, indoor units). FIG. 2 illustrates a connection relation regarding refrigerant circulation of a plurality of air conditioners (outdoor units, indoor units). FIG. 3 is a hardware configuration diagram of an air-conditioning system 1. FIG. 4 is a functional block configuration diagram of the air-conditioning system 1.

The air-conditioning system 1 includes a plurality of refrigerant systems A, B, C, D. Each of the refrigerant systems A, B, C, D includes a plurality of air conditioners.

The refrigerant system A includes an outdoor unit 10a, an indoor unit 20a, and an indoor unit 30a, through which the refrigerant circulates. The refrigerant system B includes an outdoor unit 10b, an indoor unit 20b, and an indoor unit 30b, through which the refrigerant circulates. The refrigerant system C includes an outdoor unit 10c, an indoor unit 20c, and an indoor unit 30c, through which the refrigerant circulates. The refrigerant system D includes an outdoor unit 10d, an indoor unit 20d, and an indoor unit 30d, through which the refrigerant circulates.

The outdoor unit 10a, the indoor unit 20a, and the indoor unit 30a belonging to the refrigerant system A are electrically connected in a bus-type wiring form so as to enable communications through a communication line 6a inside the system, the refrigerant system A. The outdoor unit 10b, the indoor unit 20b, and the indoor unit 30b belonging to the refrigerant system B are electrically connected in a bus-type wiring form so as to enable communications through a communication line 6b inside the system, the refrigerant system B. The outdoor unit 10c, the indoor unit 20c, and the indoor unit 30c belonging to the refrigerant system C are electrically connected in a bus-type wiring form so as to enable communications through a communication line 6c inside the system, the refrigerant system C. The outdoor unit 10d, the indoor unit 20d, and the indoor unit 30d belonging to the refrigerant system D are electrically connected in a bus-type wiring form so as to enable communications through a communication line 6d inside the system, the refrigerant system D.

The air conditioners belonging to the refrigerant systems A, B, C, D are electrically connected so as to enable communications through a communication line 5 outside the systems. According to the present embodiment, the outdoor unit 10a belonging to the refrigerant system A, the outdoor unit 10b belonging to the refrigerant system B, the outdoor unit 10c belonging to the refrigerant system C, and the outdoor unit 10d belonging to the refrigerant system D are connected in a bus-type wiring form through the communication line 5 outside the systems.

Furthermore, each of the refrigerant systems A, B, C, D is connected to a central controller 9 through a communication line 9a. The central controller 9 may manage and control the air conditioners belonging to the respective refrigerant systems A, B, C, D.

(2) Overview of Refrigerant Circuit

The refrigerant systems A, B, C, D include refrigerant circuits 2a, 2b, . . . , which are configured by connecting refrigerant devices belonging thereto inside the respective systems. The respective refrigerant systems enable communications through the communication line 5 outside the systems, but the refrigerant circuits 2a, 2b, . . . , in the respective refrigerant systems are physically independent from each other so that the refrigerant does not move in and out among the refrigerant systems. Further, a lower-case suffix corresponding to the system name is attached to a device, or the like, belonging to each system. The descriptions of the devices belonging to the refrigerant systems B, C, D other than the refrigerant system A are omitted as the descriptions may be understood as the description of the device corresponding to the refrigerant system A.

The refrigerant system A includes the outdoor unit 10a, the indoor unit 20a, the indoor unit 30a, a liquid refrigerant connection pipe 4a, a gas refrigerant connection pipe 3a, and an air-conditioning controller 8a that controls various operations in the refrigerant system A.

The refrigerant system A performs a vapor-compression refrigeration cycle in the refrigerant system A to air-condition a target space where the indoor unit 20a is provided and a target space where the indoor unit 30a is provided.

(2-1) Outdoor Unit

The outdoor unit 10a is connected to the indoor unit 20a and the indoor unit 30a through the liquid refrigerant connection pipe 4a and the gas refrigerant connection pipe 3a to form part of the refrigerant circuit 2a of the refrigerant system A. The outdoor unit 10a primarily includes a compressor 11a, a four-way switching valve 12a, an outdoor heat exchanger 13a, an outdoor expansion valve 16a, a low-pressure receiver 14a, an outdoor fan 15a, an outdoor controller 17a, and the like.

The compressor 11a is a device that compresses a low-pressure refrigerant in the refrigeration cycle of the refrigerant system A to a high pressure. According to the present embodiment, the compressor 11a is used, for which the capacity is variable by controlling the operation frequency.

The four-way switching valve 12a switches the connection state in the refrigerant circuit 2a so as to switch between the state (see the solid lines in FIG. 2) where a discharge side of the compressor 11a is connected to the outdoor heat exchanger 13a while a suction side of the compressor 11a is connected to the gas refrigerant connection pipe 3a through the low-pressure receiver 14a and the state (see the dotted lines in FIG. 2) where the discharge side of the compressor 11a is connected to the gas refrigerant connection pipe 3a while the suction side of the compressor 11a is connected to the outdoor heat exchanger 13a through the low-pressure receiver 14a.

The outdoor heat exchanger 13a is a heat exchanger that functions as a condenser or radiator of the high-pressure refrigerant in the refrigeration cycle of the refrigerant system A during a cooling operation and functions as an evaporator of the low-pressure refrigerant in the refrigeration cycle of the refrigerant system A during a heating operation.

The outdoor fan 15a supplies outdoor air to the outdoor heat exchanger 13a in the outdoor unit 10a and, after heat-exchanging with the refrigerant in the outdoor heat exchanger 13a, generates an air flow to be discharged to the outside of the outdoor unit 10a. The outdoor fan 15a is rotationally driven by an outdoor fan motor.

The outdoor expansion valve 16a is provided between a liquid-side end portion of the outdoor heat exchanger 13a and the liquid refrigerant connection pipe 4a. The outdoor expansion valve 16a is, for example, an electronic expansion valve whose valve opening degree is adjustable by control.

The low-pressure receiver 14a is a refrigerant container that is provided between the suction side of the compressor 11a and one of connection ports of the four-way switching valve 12a so as to store excess refrigerant in the refrigerant circuit 2a as liquid refrigerant.

The outdoor controller 17a controls the operation of each unit included in the outdoor unit 10a. As illustrated in FIG. 3, the outdoor controller 17a includes a processor 171a, a RAM 172a, a ROM 173a, a network interface 174a, and the like. The processor 171a includes, for example, any one or more of a CPU (Central Processing Unit), an MPU (Micro Processing Unit), a GPU (Graphics Processing Unit), a DSP (Digital Signal Processor), an ASIC (Application Specific Integrated Circuit), a PLD (Programmable Logic Device), and an FPGA (Field Programmable Gate Array). The RAM 172a is a Random Access Memory and functions as a primary storage memory or a working memory. The ROM 173a is a Read Only Memory and stores programs to be read and executed by the processor 171a in order to perform various kinds of control and processing, data for the programs, etc. The network interface 174a is an interface that communicably connects the outdoor controller 17a with other devices. Specifically, the network interface 174a enables communications between the outdoor controller 17a and an indoor controller 25a and an indoor controller 35a through the communication line 6a inside the system. Further, the network interface 174a enables communications between the outdoor controller 17a and the outdoor controllers belonging to the other refrigerant systems B, C, D through the communication line 5 outside the systems. Further, the network interface 174a enables communications between the outdoor controller 17a and the above-described central controller 9 through the communication line 9a. Moreover, the network interface 174a includes a high-pass filter (HPS) 176a for communications through the communication line 5. Therefore, the communication between the outdoor controller 17a and the device outside the system through the communication line 5 may be performed, not with predetermined low-frequency signals, but only with predetermined high-frequency signals. Specifically, for example, the outdoor controller 17a of the refrigerant system A and an outdoor controller 17b of the refrigerant system B perform communications using high-frequency signals between the network interface 174a and a network interface 174b through the high-pass filter 176a, the communication line 5 outside the systems, and a high-pass filter 176b. Further, the outdoor controller 17a may communicate with the indoor controllers 25a, 35a inside the identical refrigerant system by using high-frequency and/or low-frequency signals, and the outdoor controller 17a may communicate with the central controller 9 by using high-frequency and/or low-frequency signals.

Moreover, various sensors, which are not illustrated, are provided for the outdoor unit 10a and are connected so that the outdoor controller 17a may obtain detection values.

(2-2) Indoor Unit

The indoor unit 20a and the indoor unit 30a are installed on a wall surface, a ceiling, or the like, in a room that is an identical or different target space. The indoor unit 20a and the indoor unit 30a are connected in parallel to the outdoor unit 10a through the liquid refrigerant connection pipe 4a and the gas refrigerant connection pipe 3a to form part of the refrigerant circuit 2a of the refrigerant system A.

The indoor unit 20a includes an indoor heat exchanger 21a, an indoor fan 22a, an indoor expansion valve 26a, an indoor temperature sensor 23a, a remote controller 24a, and the indoor controller 25a.

A liquid side of the indoor heat exchanger 21a is connected to the liquid refrigerant connection pipe 4a, and a gas side end is connected to the gas refrigerant connection pipe 3a. The indoor heat exchanger 21a is a heat exchanger that functions as an evaporator of the low-pressure refrigerant in the refrigeration cycle during a cooling operation and functions as a condenser or radiator of the high-pressure refrigerant in the refrigeration cycle during a heating operation.

The indoor fan 22a takes in the indoor air in the air-conditioning target space into the indoor unit 20a and, after heat-exchanging with the refrigerant in the indoor heat exchanger 21a, generates an air flow to be discharged to the outside of the indoor unit 20a. The indoor fan 22a is rotationally driven by an indoor fan motor.

The indoor expansion valve 26a is provided between a liquid-side end portion of the indoor heat exchanger 21a and the liquid refrigerant connection pipe 4a. The indoor expansion valve 26a is, for example, an electronic expansion valve whose valve opening degree is adjustable by control.

The indoor temperature sensor 23a detects the temperature of the space targeted by the indoor unit 20a and transmits it to the indoor controller 25a.

The remote controller 24a is operated by a user, or the like, to receive, for example, a setting temperature and selection of an operating mode such as cooling operation or heating operation and transmits it to the indoor controller 25a.

As illustrated in FIG. 3, the indoor controller 25a includes a processor 251a, a RAM 252a, a ROM 253a, a network interface 254a, and the like. The processor 251a includes, for example, any one or more of a CPU, MPU, GPU, DSP, ASIC, PLD, and FPGA. The RAM 252a is a Random Access Memory and functions as a primary storage memory or a working memory. The ROM 253a is a Read Only Memory and stores programs to be read and executed by the processor 251a in order to perform various types of control and processing, data for the programs, etc. The network interface 254a is an interface that communicably connects the indoor controller 25a with other devices. Specifically, the network interface 254a enables communications between the indoor controller 25a and the indoor controller 35a through the communication line 6a inside the system. Further, the network interface 254a enables communications between the indoor controller 25a and the outdoor controller 17a through the communication line 6a inside the system.

Further, the indoor unit 30a includes an indoor heat exchanger 31a, an indoor fan 32a, an indoor expansion valve 36a, an indoor temperature sensor 33a, a remote controller 34a, and the indoor controller 35a. Further, as illustrated in FIG. 3, the indoor controller 35a includes a processor 351a, a RAM 352a, a ROM 353a, a network interface 354a, and the like. These devices included in the indoor unit 30a correspond to the devices included in the indoor unit 20a described above, and the descriptions will be omitted.

(2-3) Air-Conditioning Controller

In the refrigerant system A, the outdoor controller 17a, the indoor controller 25a, and the indoor controller 35a are communicably connected to each other through the communication line 6a inside the system to form the air-conditioning controller 8a of the refrigerant system A.

The air-conditioning controller 8a executes an air-conditioning control process for each device in order to satisfy a setting temperature in the refrigerant system A.

(3) Functional Block Configuration

For example, with regard to the refrigerant system A, the outdoor controller 17a, the indoor controller 25a, and the indoor controller 35a have the hardware configuration illustrated in FIG. 3 so as to have the functional block configuration illustrated in FIG. 4.

The outdoor controller 17a includes an outdoor air-conditioning control unit 177a and an outdoor communication unit 178a.

The outdoor air-conditioning control unit 177a performs control to operate each device belonging to the refrigerant system A in accordance with the information on the setting temperature or the information on the operating mode from the remote controllers 24a, 34a in the identical refrigerant system or in accordance with an instruction from the central controller 9. Specifically, the outdoor air-conditioning control unit 177a performs various types of control such as start and stop of the compressor 11a, control of the operation frequency, switching control of the four-way switching valve 12a, air volume control of the outdoor fan 15a, and valve opening degree control of the outdoor expansion valve 16a.

The outdoor communication unit 178a performs the communication between the outdoor controller 17a and the central controller 9, the communication between the outdoor controller 17a and the indoor controller 25a or the indoor controller 35a in the identical refrigerant system, and the communication between the outdoor controller 17a and the outdoor controllers 17b, 17c, 17d included in the outdoor units 10b, 10c, 10d belonging to the other refrigerant systems B, C, D. The outdoor communication unit 178a includes a self-ID storage unit 1781a, a system configuration storage unit 1782a, and an outdoor recognition processing unit 1783a. The self-ID storage unit 1781a stores the IDs that are identification numbers unique to the respective air conditioners and, specifically, stores the ID of the outdoor unit 10a of the refrigerant system A. Furthermore, according to the present embodiment, the IDs of the respective air conditioners are defined corresponding to or based on the serial numbers unique to the respective air conditioners, and do not overlap each other. The system configuration storage unit 1782a stores the data in which the IDs of all the air conditioners belonging to the refrigerant system (here, the refrigerant system A), to which it (here, the outdoor unit 10a) belongs, are associated with each other. Specifically, the system configuration storage unit 1782a stores the ID of the outdoor unit 10a, the ID of the indoor unit 20a, and the ID of the indoor units 30a in association with each other so that it may be understood that the air conditioners belong to the identical refrigerant system. Although the details are given below, when a new air conditioner is introduced into the air-conditioning system 1 or when a board of an outdoor controller, an indoor controller, or the like, is newly repaired or replaced, or the like, the outdoor recognition processing unit 1783a executes various processes to recognize, in the air-conditioning system 1, the refrigerant system to which the air conditioner including the board belongs. Further, the outdoor recognition processing unit 1783a transmits signals based on the reference clock and performs a transmission interruption process or retransmission process in accordance with error detection from the reception side.

The indoor controller 25a includes an indoor air-conditioning control unit 257a and an indoor communication unit 258a.

The indoor air-conditioning control unit 257a performs control to operate each device belonging to the refrigerant system A in accordance with the information on the setting temperature or the information on the operating mode from the remote controllers 24a, 34a in the identical refrigerant system or in accordance with an instruction from the central controller 9. Specifically, the indoor air-conditioning control unit 257a performs various types of control such as obtaining detection values of the indoor temperature sensor 23a, valve opening degree control of the indoor expansion valve 26a, and air volume control of the indoor fan 22a.

The indoor communication unit 258a performs the communication between the indoor controller 25a and the outdoor controller 17a and the communication between the indoor controller 25a and the indoor controller 35a in the identical refrigerant system. The indoor communication unit 258a includes a self-ID storage unit 2581a, an outdoor-unit ID storage unit 2582a, and an indoor recognition processing unit 2583a. The self-ID storage unit 2581a stores the IDs that are identification numbers unique to the respective air conditioners and, specifically, stores the ID of the indoor unit 20a of the refrigerant system A. The outdoor-unit ID storage unit 2582a stores the ID of the outdoor unit (here, the outdoor unit 10a) belonging to the refrigerant system (here, the refrigerant system A) to which it (here, the indoor unit 20a) belongs. Although the details are given below, when a new air conditioner is introduced into the air-conditioning system 1 or when a board of an outdoor controller, an indoor controller, or the like, is newly repaired or replaced, or the like, the indoor recognition processing unit 2583a executes various processes to recognize, in the air-conditioning system 1, the refrigerant system to which the air conditioner including the board belongs. Further, the indoor recognition processing unit 2583a transmits signals based on the reference clock and performs a transmission interruption process or retransmission process in accordance with error detection from the reception side.

The indoor controller 35a includes an indoor air-conditioning control unit 357a and an indoor communication unit 358a. The indoor communication unit 358a includes a self-ID storage unit 3581a, an outdoor-unit ID storage unit 3582a, and an indoor recognition processing unit 3583a. These configurations are the same as those described for the indoor controller 25a, and therefore the description thereof will be omitted.

Although the refrigerant system A has been described above as an example, the same applies to the other refrigerant systems, the refrigerant systems B, C, D.

(4) Air-Conditioning Control Process

As described above, the refrigeration cycles of the refrigerant systems A, B, C, D in the air-conditioning system 1 are independent of each other, and the air-conditioning control process may be executed individually.

Further, although the refrigeration cycles of the refrigerant systems A, B, C, D are independent of each other, for example, when the outdoor units 10a, 10b, 10c, 10d of the respective refrigerant systems A, B, C, D receive instructions for operation start, operation stop, or the like, from the central controller 9, the control of the operation start or the control of operation stop is performed in each of the refrigerant systems A, B, C, D.

Further, although the cooling operating mode and the heating operating mode performed in the refrigerant system A will be described below as an example, the same applies to the other refrigerant systems B, C, D.

The air-conditioning controller 8a including the outdoor controller 17a, the indoor controller 25a, and the indoor controller 35a selectively performs the cooling operating mode or the heating operating mode based on the instruction received by the remote controllers 24a, 34a, the central controller 9, or the like.

In the cooling operating mode, for example, the operation frequency of the compressor 11a is controlled for the capacity so that the evaporation temperature of the refrigerant in the refrigerant circuit 2a becomes a target evaporation temperature. The gas refrigerant discharged from the compressor 11a is condensed in the outdoor heat exchanger 13a through the four-way switching valve 12a. The refrigerant flowing through the outdoor heat exchanger 13a is decompressed when passing through the outdoor expansion valve 16a whose valve opening degree is controlled. The refrigerant decompressed by the outdoor expansion valve 16a flows through the liquid refrigerant connection pipe 4a and is separated and sent to the indoor unit 20a and the indoor unit 30a. Then, each of the refrigerants is decompressed in the indoor expansion valve 26a whose valve opening degree is controlled, and evaporated in the indoor heat exchanger 21a, or decompressed in the indoor expansion valve 36a whose valve opening degree is controlled, and evaporated in the indoor heat exchanger 31a, is merged together, and then flow into the gas refrigerant connection pipe 3a. The refrigerant flowing through the gas refrigerant connection pipe 3a passes through the four-way switching valve 12a and the low-pressure receiver 14a and is again suctioned into the compressor 11a.

In the heating operating mode, the operation frequency of the compressor 11a is controlled for the capacity so that, for example, the condensation temperature of the refrigerant in the refrigerant circuit 2a becomes a target condensation temperature. The gas refrigerant discharged from the compressor 11a flows through the four-way switching valve 12a and the gas refrigerant connection pipe 3a and is then separated and sent to the indoor unit 20a and the indoor unit 30a. Then, each of the refrigerants is condensed in the indoor heat exchanger 21a and decompressed in the indoor expansion valve 26a whose valve opening degree is controlled, or condensed in the indoor heat exchanger 31a and decompressed in the indoor expansion valve 36a whose valve opening degree is controlled, is merged together, and then flows to the liquid refrigerant connection pipe 4a. The refrigerant sent to the outdoor unit 10a through the liquid refrigerant connection pipe 4a is decompressed in the outdoor expansion valve 16a and evaporated in the outdoor heat exchanger 13a. The refrigerant evaporated in the outdoor heat exchanger 13a passes through the four-way switching valve 12a and the low-pressure receiver 14a, and is again suctioned into the compressor 11a.

(5) System Recognition Process

An example of a system recognition process executed in the air-conditioning system 1 will be described by way of example.

Figure 5:
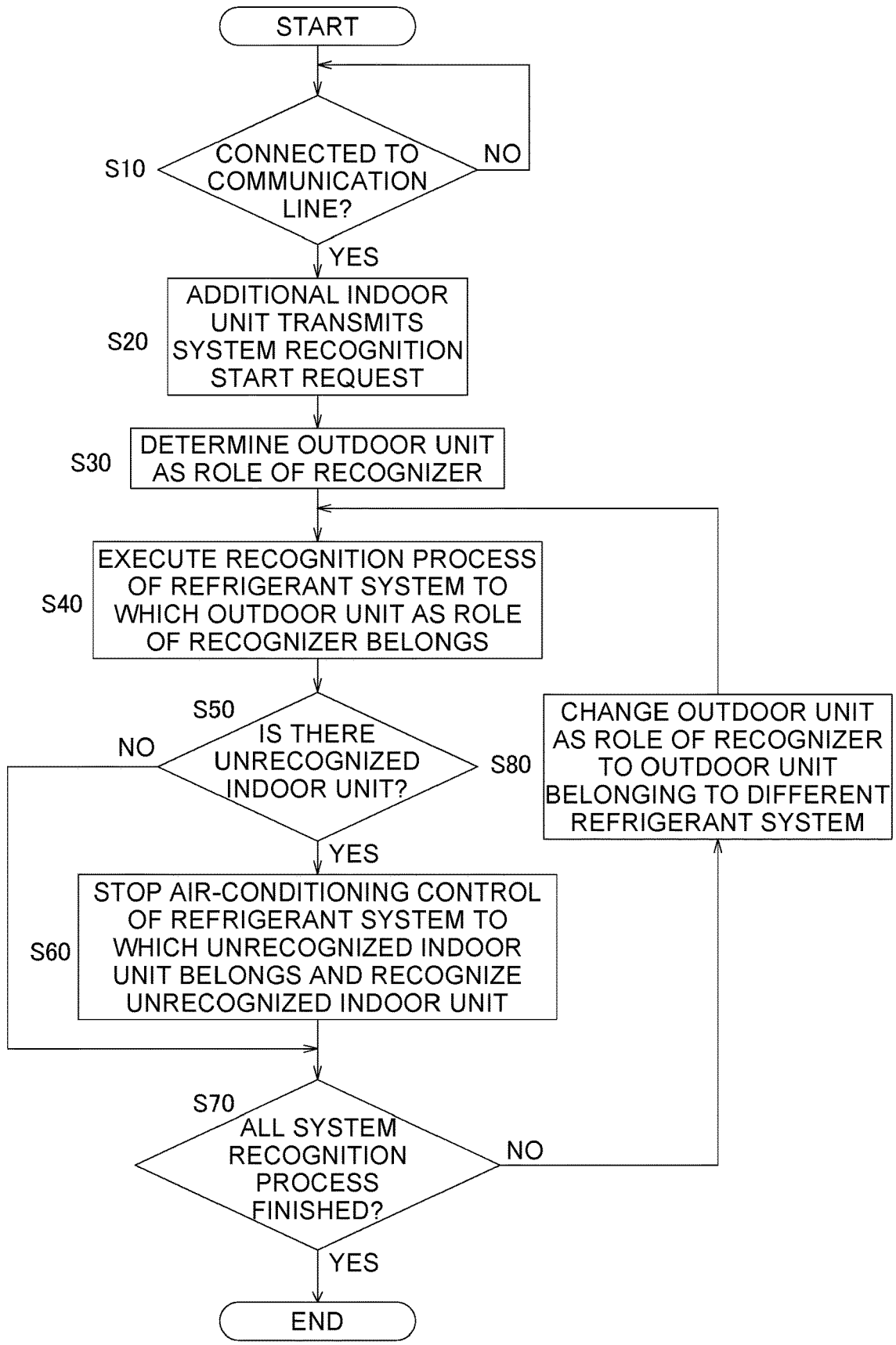
FIG. 5 is a flowchart of a system recognition process.

FIG. 5 illustrates a flowchart of the system recognition process. FIGS. 6 to 12 are explanatory diagrams illustrating the states in the respective stages of the system recognition process. In FIGS. 6 to 12, the underlined numbers in the outdoor units 10a, 10b, 10c, 10d and the indoor units 20a, 20b, 20c, 20d, 30a, 30b, 30c, 30d indicate the IDs of the air conditioners.

Figure 6:
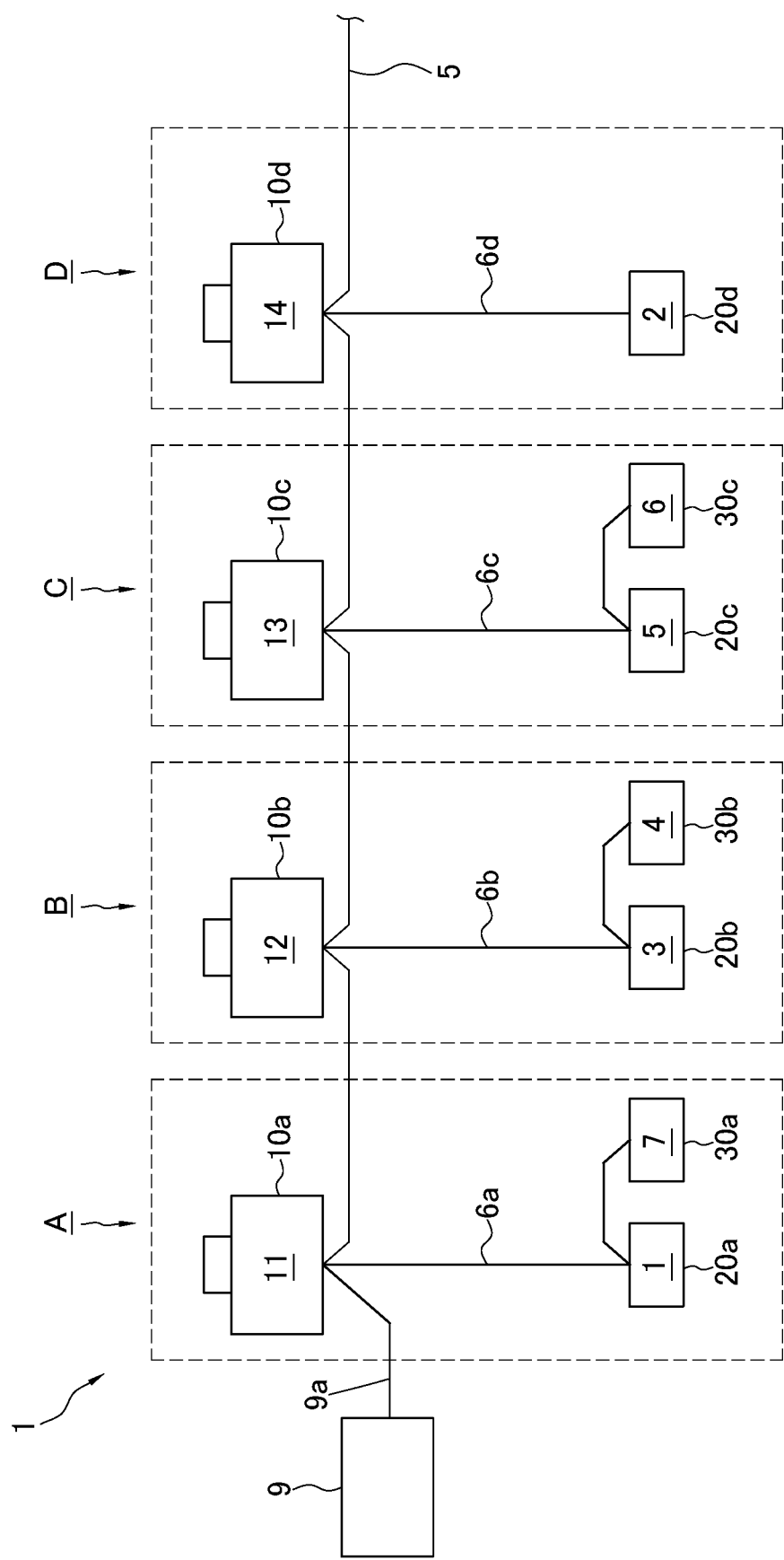
FIG. 6 is an explanatory diagram illustrating an electric connection relation before a new air conditioner is connected.
Figure 7:
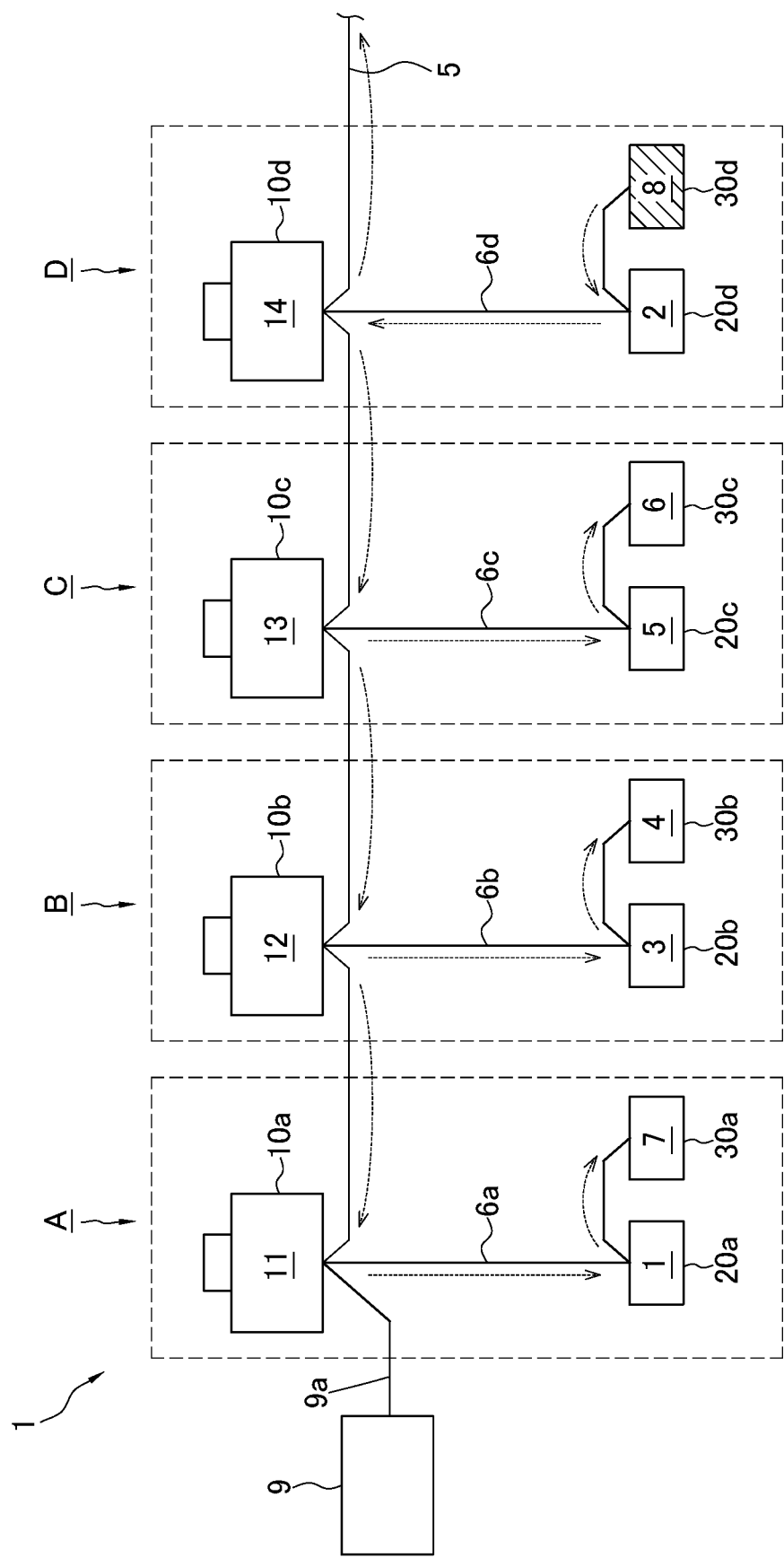
FIG. 7 is an explanatory diagram illustrating a state where a start request is transmitted from the new air conditioner.

In the case described as an example below, as illustrated in FIGS. 6 and 7, the new indoor unit 30d is additionally provided in the air-conditioning system 1 where only the indoor unit 20d is connected to the outdoor unit 10d of the refrigerant system D. The system recognition process here will be described from a state where the indoor unit 30d is additionally connected in parallel to the indoor unit 20d in the refrigerant circuit of the refrigerant system D and is physically connected with the communication line 6d inside the system. Further, it is assumed that the air-conditioning control process is being executed for each of the air conditioners (the outdoor units 10a, 10b, 10c, 10d, the indoor units 20a, 20b, 20c, 20d, 30a, 30b, 30c) of the air-conditioning system 1.

In Step S10, the indoor unit 30d, which is newly electrically connected to the air-conditioning system 1, determines whether an electric connection has been established in the air-conditioning system 1. Specifically, an indoor recognition processing unit 3583d of an indoor communication unit 358d included in an indoor controller 35d of the indoor unit 30d determines whether a connection has been established with the communication line 6d inside the system. Here, when it is determined that the connection has been established, the process proceeds to Step S20.

In Step S20, the indoor unit 30d, which is newly electrically connected to the air-conditioning system 1, transmits a signal for a system recognition start request to all of the air conditioners (the outdoor units 10a, 10b, 10c, 10d, the indoor units 20a, 20b, 20c, 20d, 30a, 30b, 30c) electrically connected in the air-conditioning system 1 other than itself. The transmission of the signal for the system recognition start request here is not limited, but is performed by for example a broadcast method as illustrated in FIG. 7. Further, according to the present embodiment, as the outdoor units 10a, 10b, 10c, 10d include the high-pass filter 176a, and the like, signals are transmitted using a predetermined low frequency. Here, the indoor recognition processing unit 3583d of the indoor communication unit 358d included in the indoor controller 35d of the indoor unit 30d transmits the signal for the system recognition start request with the connection to the communication line 6d inside the system as a trigger. Then, each of the outdoor units 10a, 10b, 10c, 10d receives the signal for the system recognition start request. Furthermore, in the stage where the signal for the system recognition start request is transmitted, the air-conditioning control process for all the refrigerant systems A, B, C, D except for the indoor unit 30d is being continued by using a time-division multiplexing communication method in the communications through the communication lines 5, 6a, 6b, 6c, 6d. The air-conditioning control process includes capability control such as control for achieving a target evaporation temperature or a target condensation temperature or control for achieving a setting temperature, process for mode selection control of a cooling operating mode or a heating operating mode, and the like (the same applies hereinafter).

Figure 8:
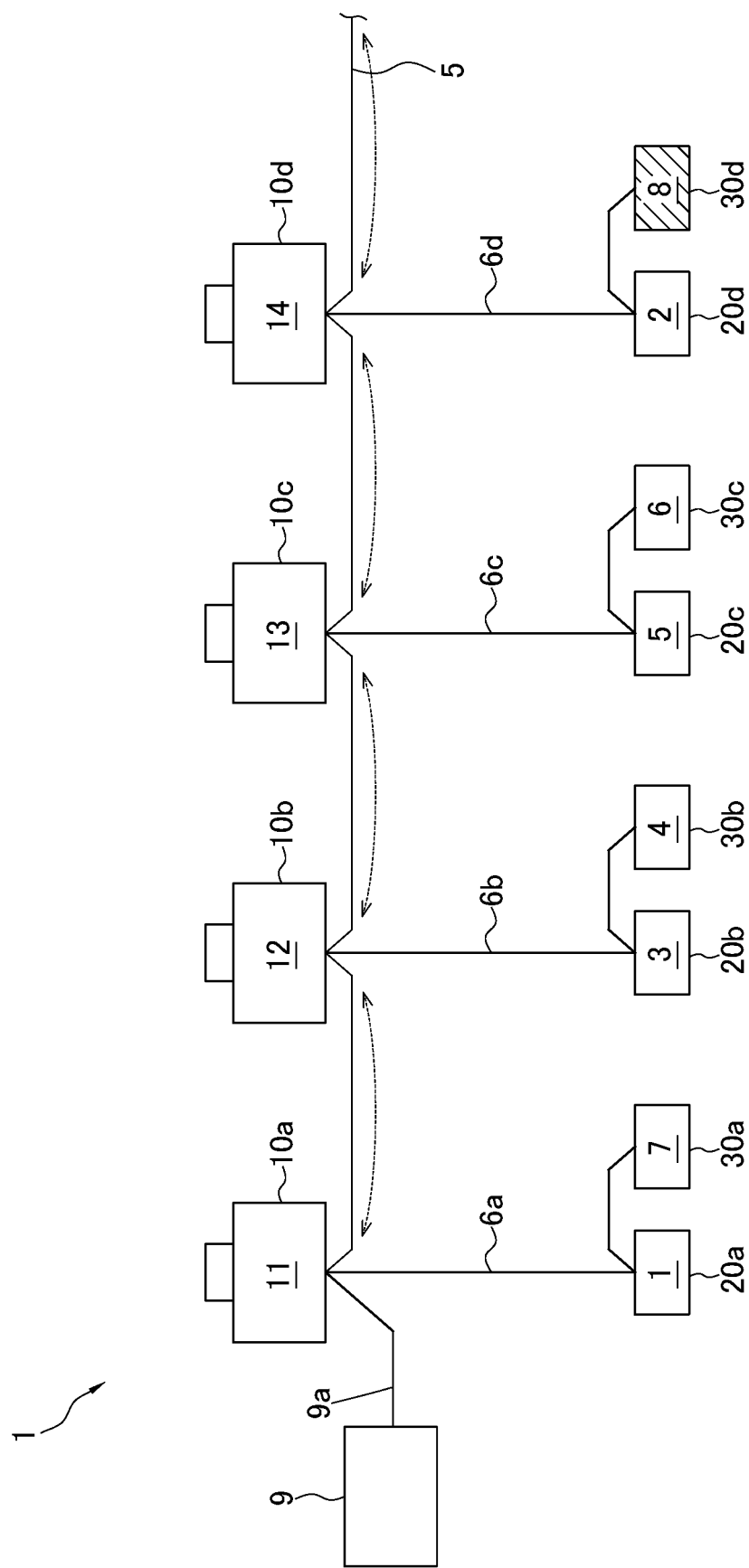
FIG. 8 is an explanatory diagram illustrating a state of communication for specifying an outdoor unit serving as a role of recognizer among a plurality of outdoor units.

In Step S30, as illustrated in FIG. 8, by mutually transmitting a predetermined high-frequency signal among the outdoor recognition processing units 1783a, 1783b, 1783c, 1783d of all the outdoor units 10a, 10b, 10c, 10d that have received the signal for the system recognition start request, one outdoor unit that serves the role of recognizer is determined based on a predetermined rule. The rule of determination here is not limited, and for example the outdoor units 10a, 10b, 10c, 10d may serve the role of recognizer in numerical order, or the like, of the IDs of their own. Furthermore, even in the stage where the communication is performed to determine the role of recognizer, the time-division multiplexing communication method is used for the communication through the communication line 5 outside the systems, and the air-conditioning control process for all the refrigerant systems A, B, C, D except for the indoor unit 30d is being continued.

In Step S40, the outdoor unit, which is determined as the role of recognizer in Step S30, executes a process to confirm the indoor units belonging to the refrigerant system to which it belongs.

Figure 9:
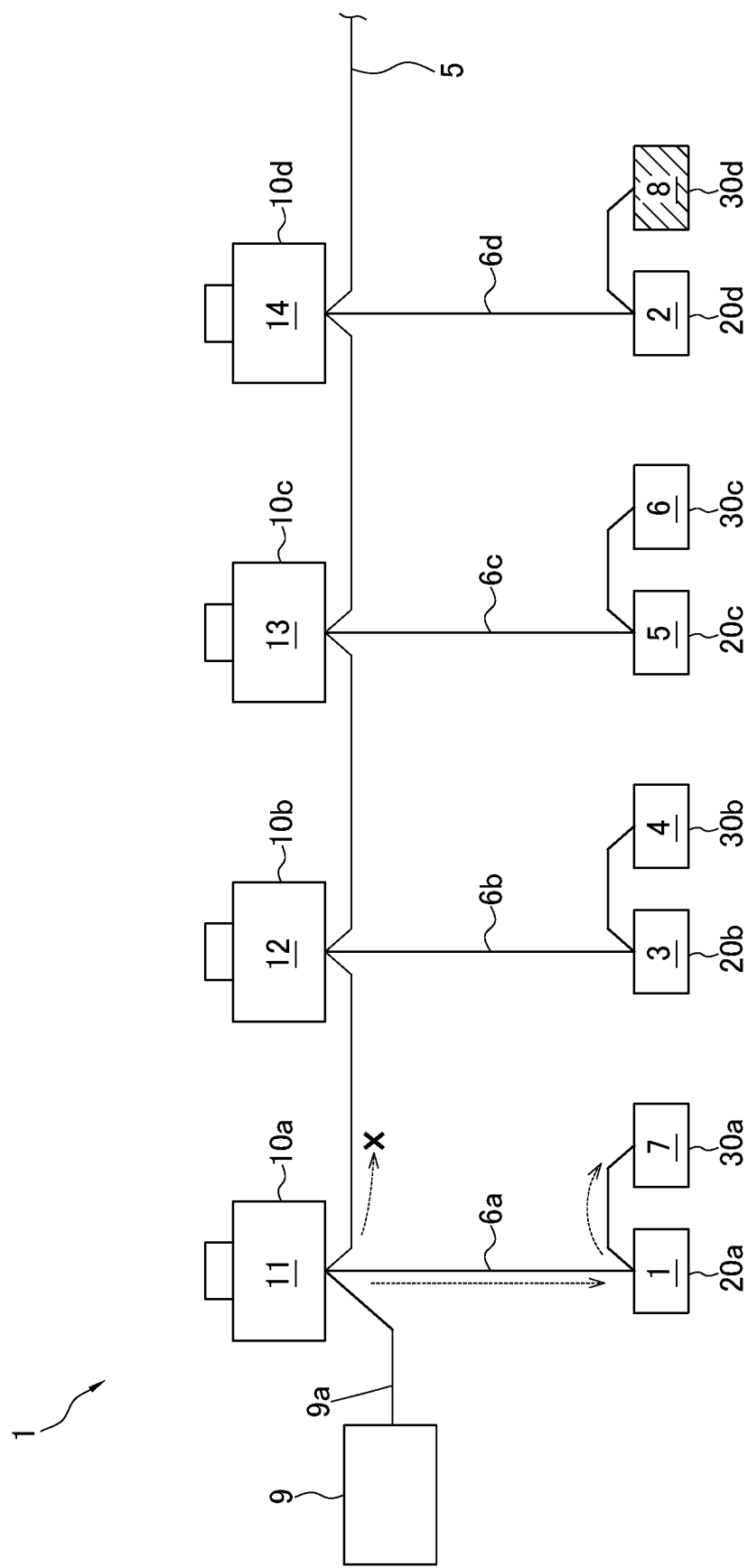
FIG. 9 is an explanatory diagram illustrating a state where a signal for system recognition is transmitted from the outdoor unit serving as a role of recognizer.

For example, when the outdoor unit determined as the role of recognizer is the outdoor unit 10a, as illustrated in FIG. 9, the outdoor recognition processing unit 1783a of the outdoor unit 10a first transmits a predetermined low-frequency signal as a prior signal for system recognition to the indoor units 20a, 30a through the communication line 6a inside the system, the refrigerant system A. Further, as the outdoor units 10a, 10b, 10c, 10d include the high-pass filters 176a, 176b, 176c, 176d, the low-frequency signal is blocked so as not to flow to the communication line 5 outside the systems. Then, the outdoor recognition processing unit 1783a of the outdoor unit 10a further transmits a predetermined high-frequency signal to not only the air conditioners belonging to the refrigerant system A of its own but also all the air conditioners through the communication lines 5, 6a to d. Here, the outdoor recognition processing unit 1783a includes, in the high-frequency signal, a system recognition inquiry that is an inquiry as to whether the previously transmitted prior signal has been received. The high-frequency signal including the system recognition inquiry further includes the information indicating the identification number "11" that is the ID of the outdoor unit 10a itself and is stored in the self-ID storage unit 1781a.

Figure 10:
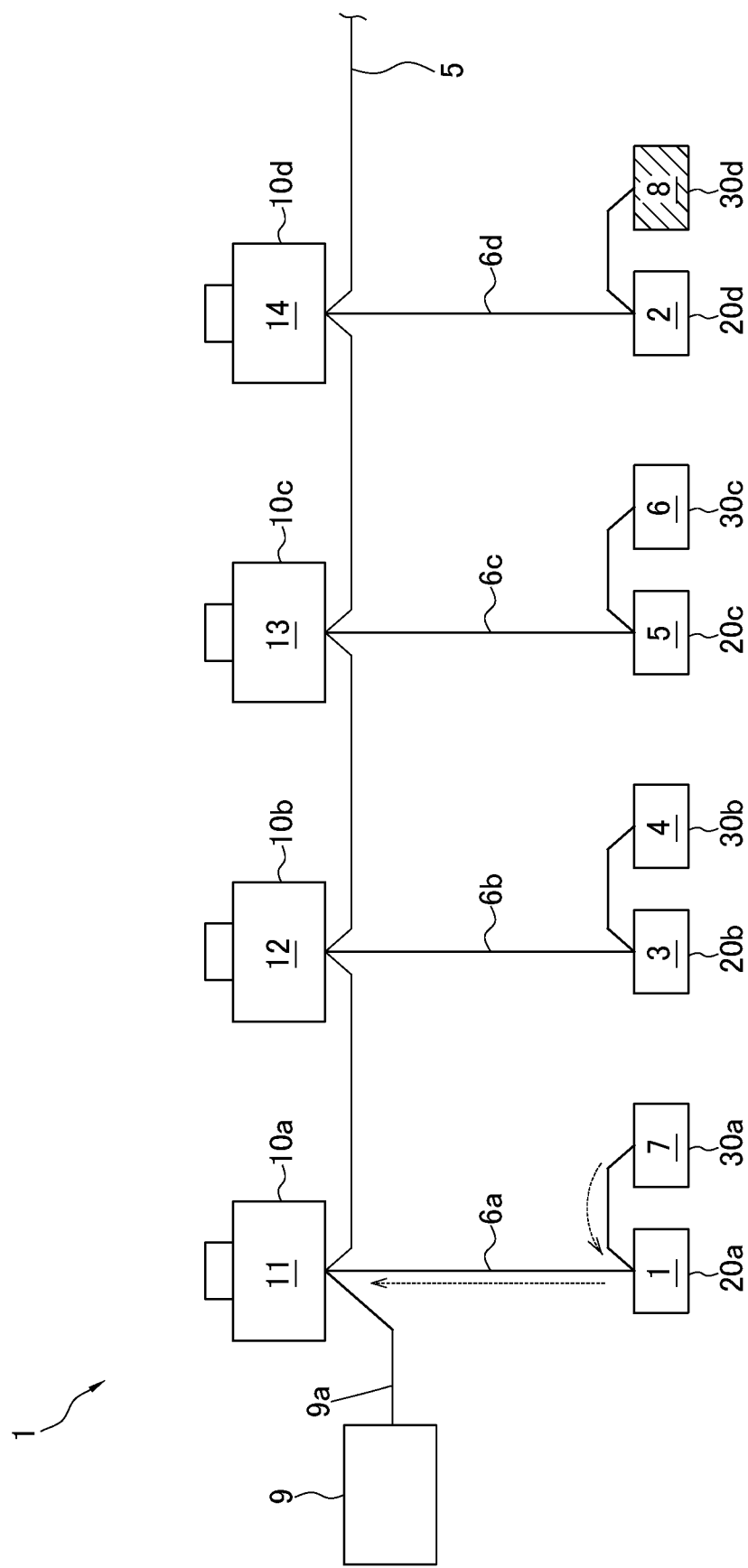
FIG. 10 is an explanatory diagram illustrating a state of transmission of a participation request signal that is a response from an indoor unit connected to the outdoor unit serving as a role of recognizer.

Then, the indoor recognition processing units 2583a, 3583a of the indoor units 20a, 30a, which have received both the prior signal and the system recognition inquiry, store the information indicating the identification number "11", which is the ID of the outdoor unit 10a, in the outdoor-unit ID storage units 2582a, 3582a, respectively, or overwrite the information when the information has already been stored. Then, as illustrated in FIG. 10, the indoor recognition processing units 2583a, 3583a of the indoor units 20a, 30a, which have received both the prior signal and the system recognition inquiry, transmit a participation request signal, which is a response indicating that the system recognition inquiry has been received, as a predetermined high-frequency signal. Here, the indoor recognition processing unit 2583a of the indoor unit 20a includes, in the participation request signal, the information indicating the identification number "1" that is the ID of the indoor unit 20a itself and is stored in the self-ID storage unit 2581a. Further, the indoor recognition processing unit 3583a of the indoor unit 30a includes, in the participation request signal, the information indicating the identification number "7" that is the ID of the indoor unit 30a itself and is stored in the self-ID storage unit 3581a.

Figure 11:
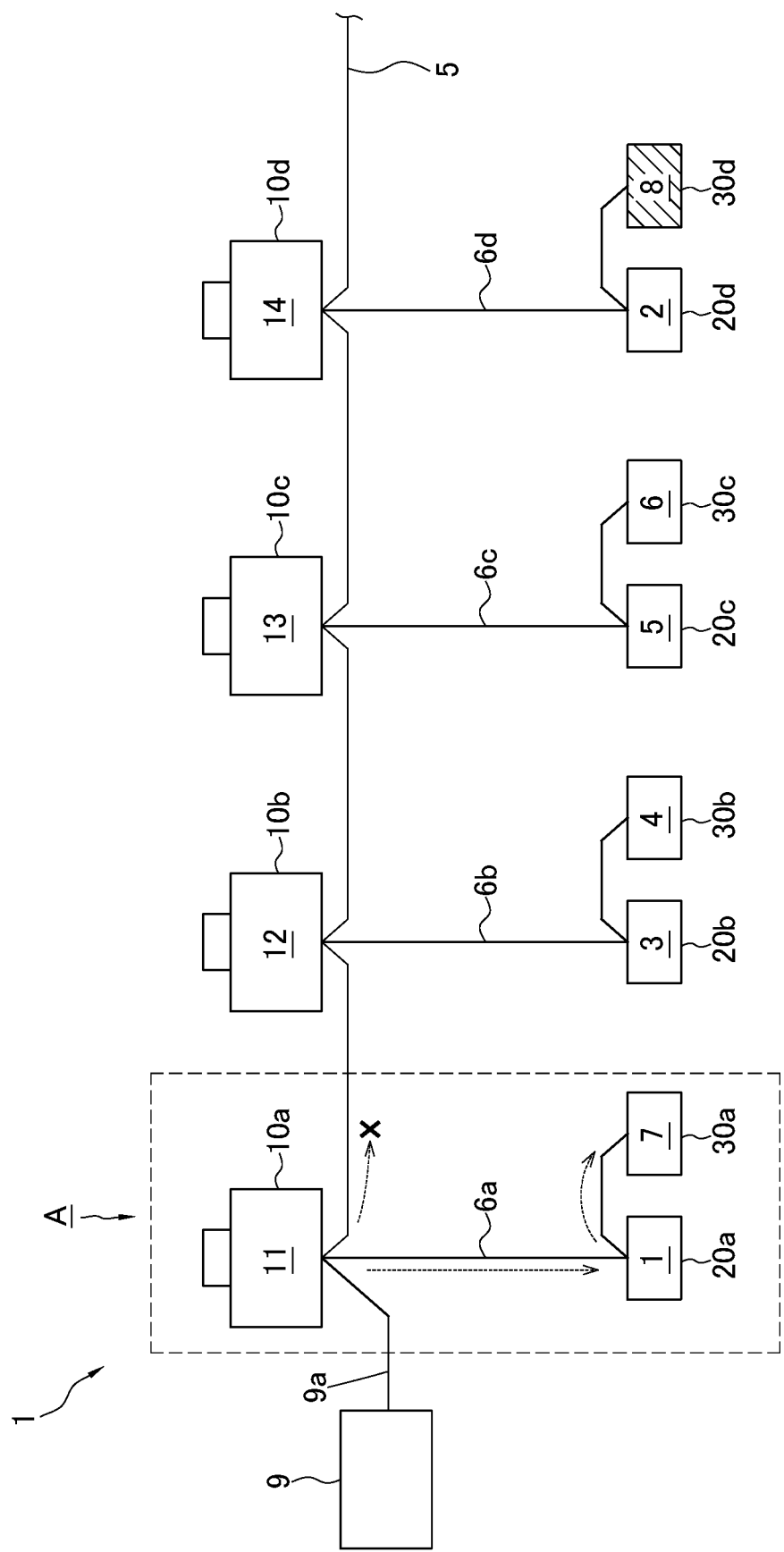
FIG. 11 is an explanatory diagram illustrating a state where the outdoor unit serving as a role of recognizer transmits a participation permission signal to the indoor unit having transmitted the participation request.

The outdoor recognition processing unit 1783a of the outdoor unit 10a, which has received the participation request signal from each of the indoor units 20a, 30a, stores the IDs of the indoor units 20a, 30a included in the participation request signals in the system configuration storage unit 1782a of its own or overwrites the information when the information has already been stored. Then, as illustrated in FIG. 11, the outdoor recognition processing unit 1783a of the outdoor unit 10a, which has received the participation request signal, transmits a participation permission signal as a predetermined high-frequency signal to each of the indoor units 20a, 30a.

As described above, the outdoor unit 10a, the indoor unit 20a, and the indoor unit 30a belonging to the refrigerant system A may recognize that they belong to the identical refrigerant system with each other, and the system recognition process for the refrigerant system A ends.

Furthermore, in the stage of exchanging the low-frequency signal as the prior signal, the high-frequency signal including the system recognition inquiry, and the signals for the participation request and the participation permission, the time-division multiplexing communication method is used for the communication through the communication line 6a inside the system, that is, the transmission is performed while switching the use timing of the transmission path for time-sharing, so that the air-conditioning control process for the refrigerant system A is continued. Furthermore, for the other refrigerant systems B, C, D, the time-division multiplexing communication method is used for the communications through the communication lines 5, 6b to d so that the air-conditioning control process is similarly continued except for the indoor unit 30d.

In Step S50, it is determined whether there is an unrecognized indoor unit in the system recognition process in Step S40. Here, when the presence of an unrecognized indoor unit is not confirmed, the process proceeds to Step S70. For example, in the system recognition process for the above-described refrigerant system A, as the indoor units 20a, 30a have already been installed and are not unrecognized in the outdoor unit 10a, the process proceeds to Step S70.

In Step S60, for the refrigerant system for which the presence of an unrecognized indoor unit has been confirmed, the outdoor air-conditioning control unit and the indoor air-conditioning control unit stop the air-conditioning control process, and the outdoor recognition processing unit and the indoor recognition processing unit execute the system recognition process for the unrecognized indoor unit.

In Step S70, the outdoor recognition processing units 1783a, 1783b, 1783c, 1783d of the outdoor units 10a, 10b, 10c, 10d communicate with each other to determine whether the system recognition process for all the refrigerant systems has been finished. Here, when it is determined that the system recognition process has been finished for all the refrigerant systems, the system recognition process ends. When it cannot be said that the system recognition process for all has been finished, the process proceeds to Step S80.

In Step S80, the outdoor unit as the role of recognizer is changed to the outdoor unit belonging to the different refrigerant system, and the process proceeds to Step S40.

By the above-described process, for example, the system recognition process for the refrigerant system B using the outdoor unit 10b of the refrigerant system B as the role of recognizer is executed subsequent to the system recognition by the outdoor unit 10a of the refrigerant system A as described above. By repeating this, for example, the system recognition process for the refrigerant system C using the outdoor unit 10c of the refrigerant system C as the role of recognizer is subsequently executed, and further, the system recognition process for the refrigerant system D using the outdoor unit 10d of the refrigerant system D as the role of recognizer is executed.

Figure 12:
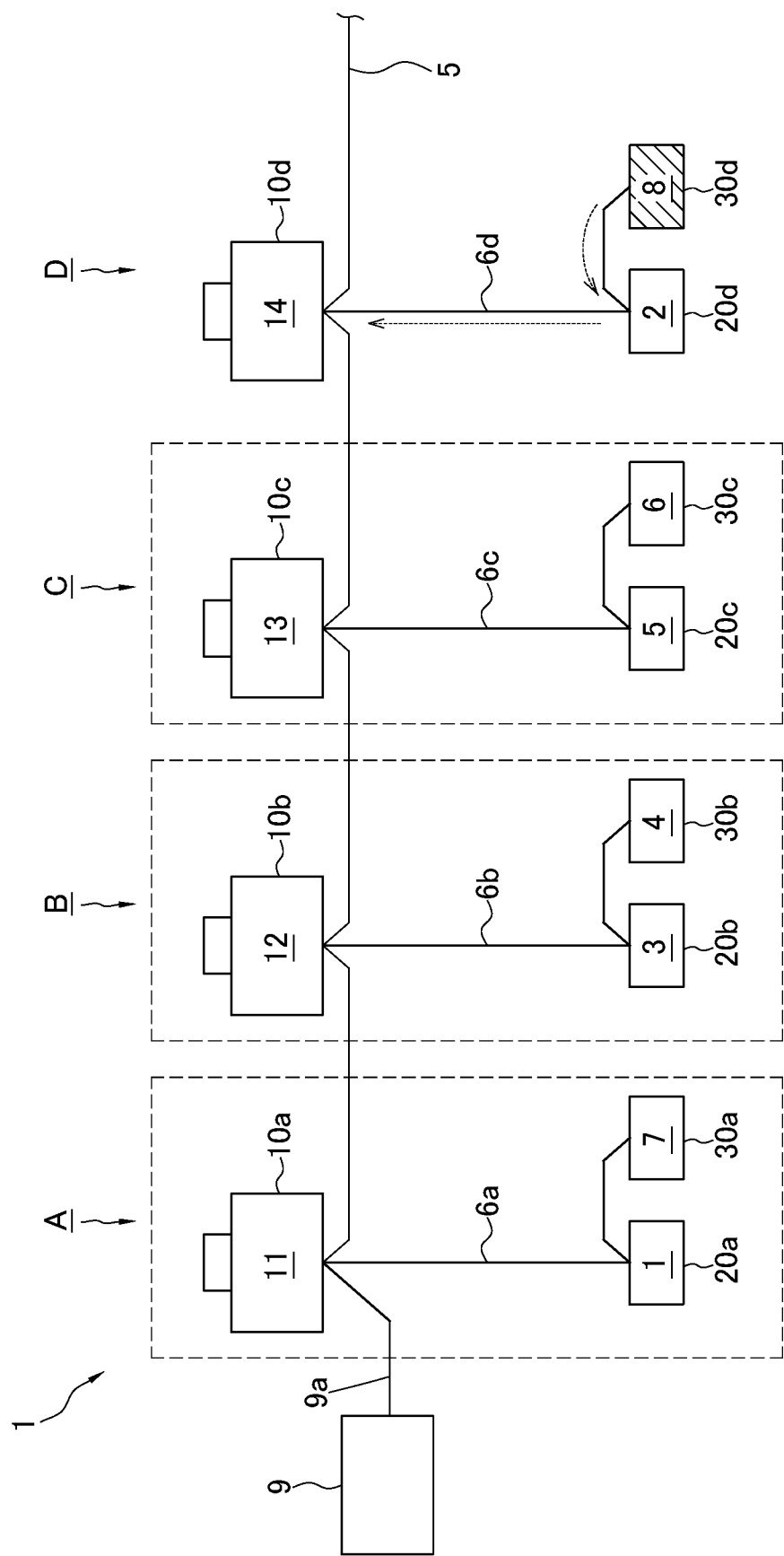
FIG. 12 is an explanatory diagram illustrating a state of transmission of a participation request signal that is a response from an indoor unit connected to an outdoor unit having taken over a role of recognizer.

Furthermore, when the system recognition process for the refrigerant system D using the outdoor unit 10d as the role of recognizer is executed in Step S40, the indoor recognition processing unit 3583d of the indoor unit 30d, which has received both the prior signal and the system recognition inquiry from the outdoor recognition processing unit 1783d of the outdoor unit 10d, includes, in the participation request signal, the information indicating the identification number "8" that is the ID of the indoor unit 30d itself and is stored in the self-ID storage unit 3581d, and responds the signal to the outdoor unit 10d, as illustrated in FIG. 12. Here, based on the fact that the system configuration storage unit 1782d of its own stores only the ID of the already installed indoor unit 20d except for the newly connected indoor unit 30d, the outdoor recognition processing unit 1783d of the outdoor unit 10d, which has received the participation request from the indoor unit 30d, determines that the unrecognized and new indoor unit 30d is connected in the refrigerant system D to which it belongs, or that there is the new indoor unit 30d that is unrecognized due to repair or replacement of a component. As described above, when the presence of the unrecognized indoor unit is confirmed during the system recognition process in Step S40, the determination result of "Is there an unrecognized indoor unit?" in Step S50 is "Yes", and the process proceeds to Step S60.

Furthermore, during each process in Steps S40, S50, S60 described above, the air-conditioning control process of each refrigerant system is continued by using the time-division multiplexing communication method for the communications through the communication lines 5, 6a, 6b, 6c, 6d except for the unrecognized indoor unit (here, the indoor unit 30d).

Further, when it is confirmed that the indoor unit 30*d* is newly connected as described above, the process in Step S60 is executed, and as illustrated in FIG. 12, the air-conditioning control process for the refrigerant system D is stopped while the air-conditioning control process for the refrigerant systems A, B, C is continued. Specifically, the driving of a compressor 11*d* and an outdoor fan 15*d* in the outdoor unit 10*d* and an indoor fan 22*a* in the indoor unit 20*d* in the refrigerant system D is stopped. Further, the stopped state of the indoor unit 30*d* is continuously maintained. Further, the indoor recognition processing unit 3583*d* of the indoor unit 30*d* stores the identification number "14", which is the ID of the outdoor unit 10*d* in the refrigerant system D to which it belongs, in the outdoor-unit ID storage unit 3582*d* of its own. Further, the outdoor recognition processing unit 1783*d* of the outdoor unit 10*d* newly stores, in the system configuration storage unit 1782*d* of its own, the identification number "8", which is the ID of the indoor unit 30*d*, in addition to the already stored identification number "2", which is the ID of the indoor unit 20*d*. As described above, the outdoor unit 10*d*, the indoor unit 20*d*, and the indoor unit 30*d* belonging to the refrigerant system D may recognize that they belong to the identical refrigerant system with each other, and the system recognition process for the refrigerant system D ends.

Moreover, after the system recognition process for the newly added indoor unit 30*d* is finished, the outdoor recognition processing unit 1783*d* of the outdoor unit 10*d* performs initial transfer including the information for performing various initial settings, and the like, to each of the indoor units 20*d*, 30*d* and, after the initial settings are completed by a known method, the air-conditioning control process for the refrigerant system D including the indoor unit 30*d* is resumed.

(6) Features of Embodiment

With the air-conditioning system 1 according to the present embodiment, even when the unrecognized air conditioner (the indoor unit 30*d*) is connected and the system recognition process is executed for the unrecognized air conditioner (the indoor unit 30*d*), the air-conditioning control process may be continued for the refrigerant system (the refrigerant systems A, B, C) to which the unrecognized air conditioner (the indoor unit 30*d*) does not belong.

Also, for the refrigerant system (the refrigerant system D) to which the unrecognized air conditioner (the indoor unit 30*d*) belongs, the operation of the already installed air conditioner (the outdoor unit 10*d*, the indoor unit 20*d*) may be continued until the system recognition process is started for the unrecognized air conditioner (the indoor unit 30*d*).

Specifically, by using the time-division multiplexing communication method in the communication lines 5, 6*a* to *d*, the transmission of the signal for the system recognition process is temporarily held at the timing when the signal for the air-conditioning control process is transmitted, and the signal for the system recognition process is transmitted again in a situation where no signal for the air-conditioning control process is transmitted. This makes it possible to proceed with the system recognition process without interrupting the air-conditioning control process.

As described above, even when the system recognition process is executed for the unrecognized air conditioner, the air-conditioning control process by the already installed air conditioner is continued, and thus it is possible to suppress the deterioration of the comfort in the air-conditioning target space.

Moreover, according to the present embodiment, the communication (limited to signals using a predetermined high frequency) across the refrigerant systems and the communication inside the refrigerant system are distinguished from each other, and it is possible to transmit signals only inside the refrigerant system; thus, the system recognition work for the air conditioner present inside the refrigerant system is facilitated.

(7) Other Embodiments

In the case described as an example according to the above-described embodiment, the air-conditioning control process and the system recognition process are simultaneously executed by time-division multiplexing transmission.

On the other hand, the transmission method for preventing interruption of the air-conditioning control process is not limited thereto, and it is possible to use a known communication method such as half-duplex communication for collision avoidance, CSMA/CD (Carrier Sense Multiple Access/Collision Detection) competition method, or AMI coding method. For example, a frequency-division multiplexing communication method may be used by setting the frequency of the signal used for the air-conditioning control process and the frequency of the signal used for the system recognition process in different frequency bands.

(8) Others

Furthermore, in the air-conditioning system, the recognition process may be executable while the control process is executed by transmission through both the communication line inside the system and the communication line outside the systems.

For the frequency-division multiplexing transmission, the frequency used in the transmission for the control process is different from the frequency used in the transmission for the recognition process. For example, a high frequency may be used for the control process, and a low frequency may be used for the recognition process.

Furthermore, the unrecognized air conditioner may be an air conditioner that is not recognized by any of the air conditioners other than itself.

Further, the unrecognized air conditioner may be confirmed, for example, when a new air conditioner is additionally connected, or when a component such as a control board of an existing air conditioner is replaced.

The start request is not limited and, for example, the start request may be transmitted from the unrecognized air conditioner to all the air conditioners connected through the communication line in the air-conditioning system by broadcasting.

The capability control is not limited, and when the air conditioner is controlled based on the setting temperature, examples thereof may include control on the number of revolutions of the compressor based on the setting temperature. Furthermore, the selection control of the control mode is not limited, and examples thereof may include control for selecting a specific control mode from a plurality of types of control modes such as a cooling mode and a heating mode.

Further, in the air conditioner, when the recognition process is executed in the refrigerant system other than the refrigerant system to which it belongs, the control process may be executed in the refrigerant system to which it belongs, and when the recognition process is executed in the refrigerant system to which it belongs, the control process may be unexecuted in the refrigerant system to which it belongs.

(Note)

Although the embodiment of the present disclosure has been described above, it is understood that various modifications may be made to forms and details without departing from the spirit and scope of the present disclosure described in claims.

REFERENCE SIGNS LIST

1 Air-conditioning system
5 Communication line outside system
6a to d Communication line inside system
10a to d Outdoor unit (air conditioner)
20a to d Indoor unit (air conditioner)
30a to c Indoor unit (air conditioner)
30d Indoor unit (unrecognized air conditioner)
A to D Refrigerant system

CITATION LIST

Patent Literature

PTL 1: Japanese Unexamined Patent Application Publication No. 2003-90585

The invention claimed is:

1. An air-conditioning system in which a plurality of air conditioners belonging to an identical refrigerant system are connected through a communication line inside the identical system and a plurality of air conditioners belonging to different refrigerant systems are connected through a communication line outside the different refrigerant systems, wherein
for the plurality of air conditioners belonging to the identical refrigerant system, a recognition process is executable while a control process is executed by transmission through at least the communication line inside the identical system, wherein
the recognition process is started when an unrecognized air conditioner transmits a start request, and
during the recognition process, only an air conditioning control process for the identical refrigerant system is stopped while continuously maintaining the air conditioning control process for the plurality of air conditioners belonging to the different refrigerant systems, and wherein
in the recognition process,
the air conditioners belonging to the refrigerant system to which the unrecognized air conditioner is not connected circulates the refrigerant by continuing the control process, and
the air conditioners belonging to the identical refrigerant system to which the unrecognized air conditioner is connected stops circulating refrigerant by stopping the control process.

2. An air-conditioning system in which a plurality of air conditioners belonging to an identical refrigerant system are connected through a communication line inside the identical system and a plurality of air conditioners belonging to different refrigerant systems are connected through a communication line outside the different refrigerant systems, wherein
for the plurality of air conditioners belonging to the identical refrigerant system, a recognition process is executable while a control process is executed by transmission through at least the communication line inside the identical system, wherein
in the recognition process, an unrecognized air conditioner holds an ID of the air conditioner, other than the unrecognized air conditioner, belonging to the refrigerant system identical to the refrigerant system of the unrecognized air conditioner, and
during the recognition process, only an air conditioning control process for the identical refrigerant system is stopped while continuously maintaining the air conditioning control process for the plurality of air conditioners belonging to the different refrigerant systems, and wherein
in the recognition process,
the air conditioners belonging to the refrigerant system to which the unrecognized air conditioner is not connected circulates the refrigerant by continuing the control process, and
the air conditioners belonging to the identical refrigerant system to which the unrecognized air conditioner is connected stops circulating refrigerant by stopping the control process.

3. An air conditioner in an air-conditioning system in which a plurality of air conditioners belonging to an identical refrigerant system are connected through a communication line inside the system and a plurality of air conditioners belonging to the different refrigerant systems are connected through a communication line outside the different refrigerant systems, wherein
a recognition process is executable while a control process is executed by transmission through at least the communication line inside the identical system with another air conditioner belonging to the identical refrigerant system, wherein
the recognition process is started when an unrecognized air conditioner transmits a start request, and
during the recognition process, only an air conditioning control process for the identical refrigerant system is stopped while continuously maintaining the air conditioning control process for the plurality of air conditioners belonging to the different refrigerant systems, and wherein
in the recognition process,
the air conditioners belonging to the refrigerant system to which the unrecognized air conditioner is not connected circulates the refrigerant by continuing the control process, and
the air conditioners belonging to the identical refrigerant system to which the unrecognized air conditioner is connected stops circulating refrigerant by stopping the control process.

4. An air conditioner in an air-conditioning system in which a plurality of air conditioners belonging to an identical refrigerant system are connected through a communication line inside the identical system and a plurality of air conditioners belonging to different refrigerant systems are connected through a communication line outside the different refrigerant systems, wherein
a recognition process is executable while a control process is executed by transmission through at least the communication line inside the identical system with another air conditioner belonging to the identical refrigerant system, wherein
in the recognition process, an unrecognized air conditioner holds an ID of the air conditioner, other than the unrecognized air conditioner, belonging to the refrigerant system identical to the refrigerant system of the unrecognized air conditioner, and
during the recognition process, only an air conditioning control for the identical refrigerant system is stopped while continuously maintaining the air conditioning control process for the plurality of air conditioners belonging to the different refrigerant systems, and wherein in the recognition process, the air conditioners belonging to the refrigerant system to which the unrecognized air conditioner is not connected circulates the identical refrigerant by continuing the control process, and the air conditioners belonging to the refrigerant system to which the unrecognized air conditioner is connected stops circulating refrigerant by stopping the control process.

5. A method for recognizing an air conditioner in an air-conditioning system in which a plurality of air conditioners belonging to an identical refrigerant system are connected through a communication line inside the identical system and a plurality of air conditioners belonging to different refrigerant systems are connected through a communication line outside the different refrigerant systems, the method comprising, for the plurality of air conditioners belonging to the identical refrigerant system, executing a recognition process while executing a control process by transmission through at least the communication line inside the identical system, wherein in the recognition process, an unrecognized air conditioner transmits a start request, and during the recognition process, only an air conditioning control process for the identical refrigerant system is stopped while continuously maintaining the air conditioning control process for the plurality of air conditioners belonging to the different refrigerant systems, and wherein in the recognition process, the air conditioners belonging to the refrigerant system to which the unrecognized air conditioner is not connected circulates the refrigerant by continuing the control process, and the air conditioners belonging to the identical refrigerant system to which the unrecognized air conditioner is connected stops circulating refrigerant by stopping the control process.

6. A method for recognizing an air conditioner in an air-conditioning system in which a plurality of air conditioners belonging to an identical refrigerant system are connected through a communication line inside the identical system and a plurality of air conditioners belonging to different refrigerant systems are connected through a communication line outside the different refrigerant systems, the method comprising, for the plurality of air conditioners belonging to the identical refrigerant system, executing a recognition process while executing a control process by transmission through at least the communication line inside the identical system, wherein the recognition process is executed when an unrecognized air conditioner holds an ID of the air conditioner, other than the unrecognized air conditioner, belonging to the refrigerant system identical to the refrigerant system of the unrecognized air conditioner, and during the recognition process, only an air conditioning control process for the identical refrigerant system is stopped while continuously maintaining the air conditioning control process for the plurality of air conditioners belonging to the different refrigerant systems, and wherein in the recognition process, the air conditioners belonging to the refrigerant system to which the unrecognized air conditioner is not connected circulates the refrigerant by continuing the control process, and the air conditioners belonging to the identical refrigerant system to which the unrecognized air conditioner is connected stops circulating refrigerant by stopping the control process.

* * * * *